United States Patent [19]  
Henk

[11] Patent Number: 4,556,707  
[45] Date of Patent: Dec. 3, 1985

[54] TRIAZOLE-GROUP-CONTAINING DISAZO REACTIVE DYESTUFF

[75] Inventor: Hermann Henk, Cologne, Fed. Rep. of Germany

[73] Assignee: Bayer Aktiengesellschaft, Leverkusen, Fed. Rep. of Germany

[21] Appl. No.: 576,056

[22] Filed: Feb. 1, 1984

[30] Foreign Application Priority Data

Feb. 25, 1983 [DE] Fed. Rep. of Germany ....... 3306696

[51] Int. Cl.⁴ .................. C09B 62/09; C09B 62/25; C09B 62/475; C09B 62/493
[52] U.S. Cl. .................. 534/635; 534/588; 534/618; 534/625; 534/630; 534/632; 534/633; 534/636; 534/640; 534/641; 534/642; 534/643; 534/800
[58] Field of Search ........... 260/157, 154, 153, 146 R, 260/146 D, 146 T; 534/638, 632, 636, 635, 637

[56] References Cited

U.S. PATENT DOCUMENTS 3,117,958  1/1964  Starn et al. ..................... 260/153  
3,186,980  6/1965  Litke .............................. 260/157  
3,222,352  12/1965  Monagle ......................... 260/157  
3,320,231  5/1967  Ammann ........................ 260/153

FOREIGN PATENT DOCUMENTS 559272   6/1958  Canada ........................... 260/157  
1225319  9/1966  Fed. Rep. of Germany ...... 260/157  
1366546  7/1964  France ............................ 260/157  
998358   7/1965  United Kingdom ............. 260/157  
1101364  1/1968  United Kingdom ............. 260/157

Primary Examiner—Floyd D. Higel  
Attorney, Agent, or Firm—Sprung Horn Kramer & Woods

[57] ABSTRACT

The invention provides reactive dyestuffs of the formula

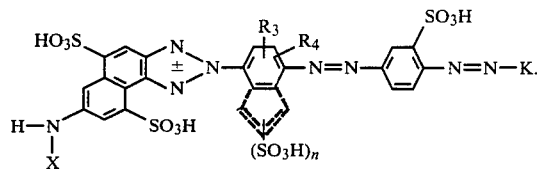

wherein X is a fibre-reactive group of the triazine or pyrimidine series; $R_3$ and $R_4$ are each hydrogen; n is 0 or 1; and k is a pyridone or pyrimidone coupling component; the dyestuffs are particularly suitable for dyeing and printing natural and regenerated cellulose fibre materials and synthetic polyamide fibre materials.

2 Claims, No Drawings

TRIAZOLE-GROUP-CONTAINING DISAZO REACTIVE DYESTUFF

The present invention relates to optionally metal-containing reactive dyestuffs which, in the form of the free acid, have the general formula (I)

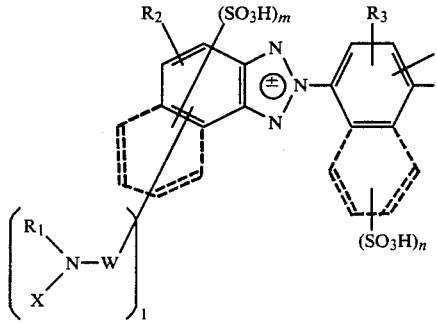

(I)

wherein
- K = the radical of a coupling component, preferably a coupling component of the benzene, naphthalene, pyrazolone, pyridone, pyrimidone, indole, aminopyrazole, aminopyridine, aminopyrimidine or acetoacetarylide series,
- W = a direct bond or a bridge member to a C atom of the benzene or naphthalene nucleus or to a C atom of an aromatic-carbocyclic or aromatic-heterocyclic ring of the coupling component K,
- $R_1$ and $R_2$ = independently of each other, hydrogen or optionally substituted $C_1$-$C_4$-alkyl,
- $R_3$ and $R_4$ = independently of each other, hydrogen, optionally substituted $C_1$-$C_4$-alkyl, $C_1$-$C_4$-alkoxy, $C_1$-$C_4$-alkylcarbonylamino, carboxyl, halogen, hydroxyl or sulpho,
- X = a fibre-reactive radical,
- l = 0 or 1,
- m = 1, 2 or 3,
- n = 0 or 1, and
- p = 0 or 1, and to processes for their preparation and their use for dyeing and printing OH- and NH-containing fibre materials, such as cellulose, wool and synthetic polyamides.

Fibre-reactive radicals X are to be understood as meaning those which have one or more reactive groups or detachable substituents which on application of the dyestuffs to cellulose materials in the presence of acid-binding agents and, if appropriate, under heat are capable of reacting with the hydroxyl groups of the cellulose to form covalent bonds, or on application to superpolyamide fibres, such as wool, are capable of forming covalent bonds with the NH groups of these fibres. A large number of this type of reactive groups are described in the literature.

Preferred substituents for optionally substituted $C_1$-$C_4$-alkyl are halogen, alkoxy ($C_1$-$C_4$), $SO_3H$, COOH and hydroxyl.

W preferably represents a direct bond to a C atom of an aromatic-carbocyclic or aromatic-heterocyclic ring. Examples of suitable bridge members W are —CO—, —SO$_2$—,

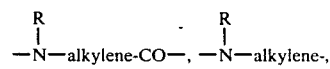

-continued

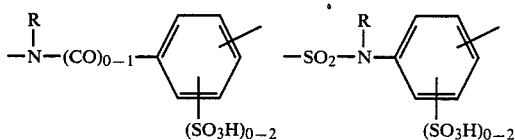

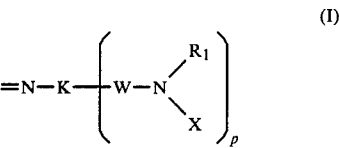

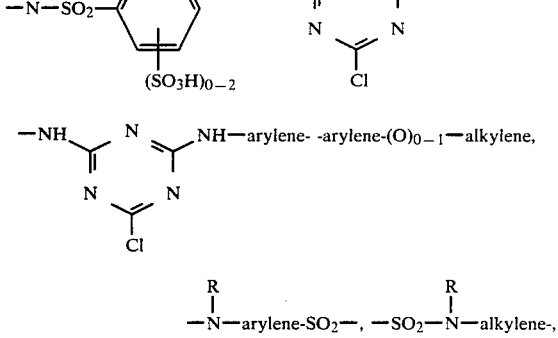

where
- R preferably = H or $C_1$-$C_4$-alkyl,
- alkylene preferably denotes $C_2$-$C_5$-alkylene and
- arylene preferably denotes optionally substituted phenyl.

Preferred substituents for optionally substituted phenyl are alkyl ($C_1$-$C_4$), alkoxy ($C_1$-$C_4$), halogen, $SO_3H$, COOH and hydroxyl.

According to the invention, suitable reactive groups which contain at least one detachable substituent bonded to a heterocyclic or to an aliphatic radical are, inter alia, those which contain at least one reactive substituent bonded to a 5- or 6-membered heterocyclic ring, such as a monazine, diazine, triazine, for example pyridine, pyrimidine, pyridazine, pyrazine, thiazine, oxazine or asymmetric or symmetric triazine ring or to a ring system of this type which has one or more fused-on aromatic rings, such as a quinoline, phthalazine, quinnoline, quinazoline, quinoxaline, acridine, phenazine and phenanthridine ring system; the 5- or 6-membered heterocyclic rings which have at least one reactive substituent are accordingly preferably those which contain one or more nitrogen atoms and can contain fused-on 5- or preferably 6-membered carbocyclic rings.

Representative examples of reactive substituents on the heterocyclic ring are halogen (CL, Br or F), ammonium, including hydrazinium, sulphonium, sulphonyl, azido-(N$_3$), thiocyanato, thio, thiolether, oxyether, sulphinic acid and sulphonic acid. Specific examples are as follows: monohalogeno- or dihalogeno-symmetrical-triazinyl radicals, for example 2,4-dichlorotriazin-6-yl, 2-amino-4-chlorotriazin-6-yl, 2-alkylamino-4-chlorotriazin-6-yl, such as 2-methylamino-4-chlorotriazin-6-yl, 2-ethylamino- or 2-propylamino-4-chlorotriazin-6-yl, 2-β-oxethylamino-4-chlorotriazin-6-yl, 2-di-β-oxethylamino-4-chlorotriazin-6-yl and the corresponding sulphuric acid half-esters, 2-diethylamino-4-chlorotriazin-6-yl, 2-morpholino- or 2-piperidino-4-chlorotriazin-6-yl, 2-cyclohexylamino-4-chlorotriazin-6-yl, 2-arylamino- and substituted arylamino-4-chlorotriazin-6-yl, such as 2-phenylamino-4-chlorotriazin-6-yl, 2-(o-, m- or p-carboxy- or sulphophenyl)-amino-4-chlorotriazin-6-yl, 2-alkoxy-4-chlorotriazin-6-yl, such as 2-methoxy- or ethoxy-4-chlorotriazin-6-yl, 2-(phenylsulphonylmethoxy)-4-chlorotriazin-6-yl, 2-aryloxy- and substituted aryloxy-4-chlorotriazin-6-yl, such as 2-phenoxy-4-chlorotriazin-6-yl, 2-(p-sulphophenyl)-oxy-4-chlorotriazin-6-yl, 2-(o-, m- or p-methyl- or methoxyphenyl)-oxy-4-chloro-triazin-6-yl, 2-alkylmercapto- or 2-arylmercapto- or 2-(substituted aryl)-mercapto-4-chlorotriazin-6-yl, such as 2-β-hydroxyethylmercapto-4-chlorotriazin-6-yl, 2-phenylmercapto-4-chlorotriazin-6-yl, 3-(4'-methylphenyl)-mercapto-4-chlorotriazin-6-yl, 2-(2',4'-dinitro)-phenyl-mercapto-4-chlorotriazin-6-yl, 2-methyl-4-chloro-triazin-6-yl, 2-phenyl-4-chlorotriazin-6-yl, 2,4-difluorotriazin-6-yl, monofluorotriazinyl radicals which are substituted by amino, alkylamino, aralkylamino or acylamino groups, where alkyl denotes in particular optionally substituted C$_1$–C$_4$-alkyl, aralkyl denotes in particular optionally substituted phenyl, C$_1$–C$_4$-alkyl, and aryl denotes in particular optionally sulpho-, alkyl-, in particular C$_1$–C$_4$-alkyl-, alkoxy-, in particular C$_1$–C$_4$-alkoxy-, carboxyl-, acylamino- and halogen-, such as fluorine-, chlorine- or bromine-, substituted phenyl or naphthyl, for example 2-amino-4-fluoro-triazin-6-yl, 2-methylamino-4-fluoro-triazin-6-yl, 2-ethylamino-4-fluoro-triazin-6-yl, 2-isopropylamino-4-fluoro-triazin-6-yl, 2-dimethylamino-4-fluoro-triazin-6-yl, 2-diethylamino-4-fluoro-triazin-6-yl, 2-β-methoxy-ethylamino-4-fluoro-triazin-6-yl, 2-β-hydroxy-ethylamino-4-fluoro-triazin-6-yl, 2-di-(β-hydroxyethylamino)-4-fluoro-triazin-6-yl, 2-β-sulphoethylamino-4-fluoro-triazin-6-yl, 2-β-sulphoethyl-methylamino-4-fluoro-triazin-6-yl, 2-carboxymethylamino-4-fluoro-triazin-6-yl, 2-β-cyanoethylamino-4-fluoro-triazin-6-yl, 2-benzylamino-4-fluoro-triazin-6-yl, 2-β-phenylethylamino-4-fluoro-triazin-6-yl, 2-benzyl-methylamino-4-fluoro-triazin-6-yl, 2-(x-sulpho-benzyl)-amino-4-fluoro-triazin-6-yl, 2-cyclohexylamino-4-fluoro-triazin-6-yl, 2-(o-, m- or p-methylphenyl)-amino-4-fluoro-triazin-6-yl, 2-(o-, m- or p-sulphophenyl)-amino-4-fluoro-triazin-6-yl, 2-(2',5'-disulphophenyl)-amino-4-fluoro-triazin-6-yl, 2-(o-, m- or p-chlorophenyl)-amino-4-fluoro-triazin-6-yl, 2-(o-, m- or p-methoxyphenyl)-4-fluoro-triazin-6-yl, 2-(2'-methyl-4'-sulphophenyl)-amino-4-fluoro-triazin-6-yl, 2-(2'-methyl-5'-sulphophenyl)-amino-4-fluoro-triazin-6-yl, 2-(2'-chloro-4'-sulphophenyl)-amino-4-fluoro-triazin-6-yl, 2-(2'-chloro-5'-sulphophenyl)-amino-4-fluoro-triazin-6-yl, 2-(2'-methoxy-4'-sulphophenyl)-amino-4-fluoro-triazin-6-yl, 2-(o-, m- or p-carboxyphenyl)-amino-4-fluoro-triazin-6-yl, 2-(2',4'-disulphophenyl)-amino-4-fluoro-triazin-6-yl, 2-(3',5'-disulphophenyl)-amino-4-fluoro-triazin-6-yl, 2-(2'-carboxy-4-sulphophenyl)-amino-4-fluoro-triazin-6-yl, 2-(6'-sulphonaphth-2'-yl)-amino-4-fluoro-triazin-6-yl, 2-(4',8'-disulphonaphth-2'-yl)-amino-4-fluoro-triazin-6-yl, 2-(6',8'-disulphonaphth-2'-yl)-amino-4-fluoro-triazin-6-yl, 2-(N-methylphenyl)-amino-4-fluoro-triazin-6-yl, 2-(N-ethylphenyl)-amino-4-fluoro-triazin-6-yl, 2-(N-β-hydroxyethylphenyl)-amino-4-fluoro-triazin-6-yl, 2-(N-iso-propylphenyl)-amino-4-fluoro-triazin-6-yl, 2-morpholino-4-fluoro-triazin-6-yl, 2-piperidino-4-fluoro-triazin-6-yl, 2-(4',6',8'-trisulphonaphth-2'-yl)-4-fluoro-triazin-6-yl, 2-(3',6',8'-trisulphonaphth-2'-yl)-4-fluoro-triazin-6-yl, 2-(3',6'-disulphonaphth-1'-yl)-4-fluoro-trazin-6-yl, mono-, di- or trihalogenopyrimidinyl radicals, such as 2,4-dichloropyrimidin-6-yl, 2,4,5-trichloropyrimidin-6-yl, 2,4-dichloro-5-nitro- or -5-methyl- or -5-carboxymethyl- or -5-carboxy- or -5-cyano- or -5-vinyl- or -5-sulpho- or -5-mono-, -di- or -trichloromethyl- or -5-carbalkoxypyrimidin-6-yl, 2,6-dichloropyrimidine-4-carbonyl, 2,4-dichloropyrimidine-5-carbonyl, 2-chloro-4-methylpyrimidine-5-carbonyl, 2-methyl-4-chloropyrimidine-5-carbonyl, 2-methylthio-4-fluoropyrimidine-5-carbonyl, 6-methyl-2,4-dichloropyrimidine-5-carbonyl, 2,4,6-trichloropyrimidine-5-carbonyl, 2,4-dichloropyrimidine-5-sulphonyl, 2-chloroquinoxaline-3-carbonyl, 2- or 3-monochloroquinoxaline-6-carbonyl, 2- or 3-monochloroquinoxaline-6-sulphonyl, 2,3-dichloroquinoxaline-6-carbonyl, 2,3-dichloroquinoxaline-6-sulphonyl, 1,4-dichlorophthalazine-6-sulphonyl or -6-carbonyl, 2,4-dichloroquinazoline-7- or -6-sulphonyl or -carbonyl, 2- or 3- or 4-(4',5'-dichloropyridaz-6'-on-1'-yl)-phenyl-sulphonyl or carbonyl, β-(4',5'-dichloropyridaz-6'-on-1'-yl)-ethylcarbonyl, N-methyl-N-(2,4-dichlorotriazin-6-yl)-carbamyl, N-methyl-N-(2-methylamino-4-chlorotriazin-6-yl)-carbamyl, N-methyl-N-(2-dimethylamino-4-chlorotriazin-6-yl)-carbamyl, N-methyl- or N-ethyl-N-(2,4-dichlorotriazin-6-yl)-aminoacetyl, N-methyl-N-(2,3-dichloroquinoxaline-6-sulphonyl)-aminoacetyl, N-methyl-N-(2,3-dichloroquinoxaline-6-carbonyl)-aminoacetyl, and the corresponding bromine and fluorine derivatives of the abovementioned chlorine-substituted heterocyclic radicals, among these, for example, 2-fluoro-4-pyrimidinyl, 2,6-difluoro-4-pyrimidinyl, 2,6-difluoro-5-chloro-4-pyrimidinyl, 2-fluoro-5,6-dichloro-4-pyrimidinyl, 2,6-difluoro-5-methyl-4-pyrimidinyl, 2-fluoro-5-methyl-6-chloro-4-pyrimidinyl, 2-fluoro-5-nitro-6-chloro-4-pyrimidinyl, 5-bromo-2-fluoro-4-pyrimidinyl, 2-fluoro-5-cyano-4-pyrimidinyl, 2-fluoro-5-methyl-4-pyrimidinyl, 2,5,6-trifluoro-4-pyrimidinyl, 5-chloro-6-chloromethyl-2-fluoro-4-pyrimidinyl, 2,6-difluoro-5-bromo-4-pyrimidinyl, 2-fluoro-5-bromo-6-methyl-4-pyrimidinyl, 2-fluoro-5-bromo-6-chloromethyl-4-pyrimidinyl, 2,6-difluoro-5-chloromethyl-4-pyrimidinyl, 2,6-difluoro-5-nitro-4-pyrimidinyl, 2-fluoro-6-methyl-4-pyrimidinyl, 2-fluoro-5-chloro-6-methyl-4-pyrimidinyl, 2-fluoro-5-chloro-4-pyrimidinyl, 2-fluoro-6-chloro-4-pyrimidinyl, 6-trifluoromethyl-5-chloro-2-fluoro-4-pyrimidinyl, 6-trifluoromethyl-2-fluoro-4-pyrimidinyl, 2-fluoro-5-nitro-4-pyrimidinyl, 2-fluoro-5-trifluoromethyl-4-pyrimidinyl, 2-fluoro-5-phenyl- or -5-methylsulphonyl-4-pyrimidinyl, 2-fluoro-5-carboxamido-4-pyrimidinyl, 2-fluoro-5-carbomethoxy-4-pyrimidinyl, 2-fluoro-5-bromo-6-trifluoromethyl-4-pyrimidinyl, 2-fluoro-6-carboxamido-4-pyrimidinyl, 2-fluoro-6-carbomethoxy-4-pyrimidinyl, 2-fluoro-6-phenyl-4-pyrimidinyl, 2-fluoro-6-cyano-4-pyrimidinyl, 2,6-difluoro-5-methylsulphonyl-4-pyrimidinyl, 2-fluoro-5-sulphonamido-4-pyrimidinyl, 2-fluoro-5-chloro-6-carbomethoxy-4-pyrimidinyl, 2,6-difluoro-5-trifluoromethyl-4-pyrimidinyl; sulphonyl-containing triazine radicals, such as 2,4-bis-(phenylsulphonyl)-triazin-6-yl, 2-(3'-carboxyphenyl)-sulphonyl-4-chlorotriazin-6-yl, 2-(3'-sulphophenyl)-sulphonyl-4-chlorotriazin-6-yl, 2,4-bis-(3'-carboxyphenylsulphonyl)-triazin-6-yl; sulphonyl-containing pyrimidine rings, such as 2-carboxymethylsulphonylpyrimidin-4-yl, 2-methylsulphonyl-6-methylpyrimidin-4-yl, 2-methylsulphonyl-6-ethylpyrimidin-4-yl, 2-phenylsulphonyl-5-chloro-6-methylpyrimidin-4-yl, 2,6-bis-methylsulphonylpyrimidin-4-yl, 2,6-bis-methylsulphonyl-5-chloropyrimidin-4-yl, 2,4-bis-methylsulphonylpyrimidine-5-sulphonyl, 2-methylsulphonylpyrimidin-4-yl, 2-phenylsulphonylpyrimidin-4-yl, 2-trichloromethylsulphonyl-6-methylpyrimidin-4-yl, 2-methylsulphonyl-5-chloro-6-methylpyrimidin-4-yl, 2-methylsulphonyl-5-bromo-6-methylpyrimidin-4-yl, 2-methylsulphonyl-5-chloro-6-ethylpyrimidin-4-yl, 2-methylsulphonyl-5-chloro-6-chloromethylpyrimidin-4-yl, 2-methylsulphonyl-4-chloro-6-methylpyrimidine-5-sulphonyl, 2-methylsulphonyl-5-nitro-6-methylpyrimidin-4-yl, 2,5,6-tris-methylsulphonylpyrimidin-4-yl, 2-methylsulphonyl-5,6-dimethylpyrimidin-4-yl, 2-methylsulphonyl-5-chloro-6-methylpyrimidin-4-yl, 2-methylsulphonyl-6-chloropyrimidin-4-yl, 2,6-bis-methylsulphonyl-5-chloropyrimidin-4-yl, 2-methylsulphonyl-6-carboxypyrimidin-4-yl, 2-methylsulphonyl-5-sulphopyrimidin-4-yl, 2-methylsulphonyl-6-carbomethoxypyrimidin-4-yl, 2-methylsulphonyl-5-carboxypyrimidin-4-yl, 2-methylsulphonyl-5-cyano-6-methoxypyrimidin-4-yl, 2-methylsulphonyl-5-chloropyrimidin-4-yl, 2-sulphoethylsulphonyl-6-methylpyrimidin-4-yl, 2-methylsulphonyl-5-bromopyrimidin-4-yl, 2-phenylsulphonyl-5-chloropyrimidin-4-yl, 2-carboxymethylsulphonyl-5-chloro-6-methylpyrimidin-4-yl, 2-methylsulphonyl-6-chloropyrimidine-4- and -5-carbonyl, 2,6-bis-(methylsulphonyl)-pyrimidine-4- or -5-carbonyl, 2-ethylsulphonyl-6-chloropyrimidine-5-carbonyl, 2,4-bis-(methylsulphonyl)-pyrimidine-5-sulphonyl, 2-methylsulphonyl-4-chloro-6-methylpyrimidine-5-sulphonyl or -carbonyl; ammonium-containing triazine rings, such as 2-trimethylammonium-4-phenylamino or -4-(o-, m- or p-sulphophenyl)-aminotriazin-6-yl, 2-(1,1-dimethylhydrazinium)-4-phenylamino- or -4-(o-, m- or p-sulphophenyl)-aminotriazin-6-yl, 2-(2-isopropylidene-1,1-dimethyl)-hydrazinium-4-phenylamino- or -4-(o-, m- or p-sulphophenyl)-aminotriazin-6-yl, 2-N-aminopyrrolidinium- or 2-N-aminopiperidinium-4-phenylamino- or -4-(o-, m- or p-sulphophenyl)-aminotriazin-6-yl, and also 4-phenylamino or 4-(sulphophenylamino)-triazin-6-yl radicals which contain, in the 2-position, in a quaternary bond on a nitrogen, 1,4-bis-azabicyclo-[2,2,2]-octane or 1,2-bis-aza-bicyclo-|0,3,3|-octane, 2-pyridinium-4-phenylamino- or -4-(o-, m- or p-sulphophenyl)-aminotriazin-6-yl and corresponding 2-oniumtriazin-6-yl radicals which are substituted in the 4-position by alkylamino, such as methylamino, ethylamino or β-hydroxyethylamino, or alkoxy, such as methoxy or alkoxy, or aroxy, such as phenoxy or sulphophenoxy groups; 2-chlorobenzothiazole-5- or -6-carbonyl or -5- or -6-sulphonyl, 2-arylsulphonyl or -alkylsulphonylbenzothiazole-5- or -6-carbonyl or -5- or -6-sulphonyl, such as 2-methylsulphonylbenzothiazole- or 2-ethylsulphonylbenzothiazole-5- or -6-sulphonyl or -carbonyl, 2-phenylsulphonylbenzothiazole-5- or -6-sulphonyl or -carbonyl and the corresponding sulpho-containing, in the fused-on benzene ring, 2-sulphonylbenzothiazole-5- or -6-carbonyl or -sulphonyl derivatives, 2-chlorobenzoxazole-5- or -6-carbonyl or -sulphonyl, 2-chlorobenzimidazole-5- or -6-carbonyl or -sulphonyl, 2-chloro-1-methylbenzimidazole-5- or -6-carbonyl or -sulphonyl, 2-chloro-4-methyl-1,3-thiazole-5-carbonyl or -4- or -5-sulphonyl, the N-oxide of 4-chloroquinoline- or 4-nitroquinoline-5-carbonyl.

Furthermore to be mentioned are reactive groups of the aliphatic series, such as acryloyl, mono-, di- or trichloroacryloyl, such as —CO—CH=CH—Cl, —CO—CCl=CH$_2$, —CO—CCl=CH—CH$_3$, and also —CO—CCl=CH—COOH, —CO—CH=CCl—COOH, β-chloropropionyl, 3-phenylsulphonylpropionyl, 3-methylsulphonylpropionyl, β-sulphatoethylaminosulphonyl, vinylsulphonyl, β-chloroethylsulphonyl, β-sulphatoethylsulphonyl, β-methylsulphonylethylsulphonyl, β-phenylsulphonylethylsulphonyl, 2-fluoro-2-chloro-3,3-difluorocyclobutane-1-carbonyl, 2,2,3,3-tetrafluorocyclobutanecarbonyl-1- or sulphonyl-1-, β-(2,2,3,3-tetrafluorocyclobut-1-yl)-acryloyl, α- or β-bromoacryloyl, α- or β-alkylsulphonylacryloyl or -arylsulphonylacryloyl group, such as α- or β-methylsulphonylacryloyl.

Preferred dyestuffs have the general formula (II)

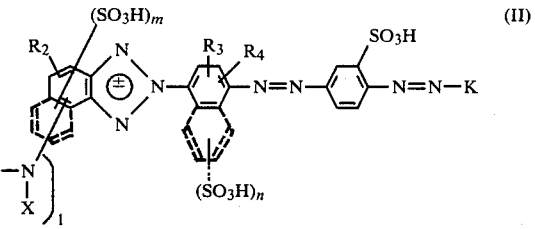

wherein
X, R$_2$, R$_3$, R$_4$, 1, m, n and K have the abovementioned meaning.

Further preferred dyestuffs are those of the general formula (III)

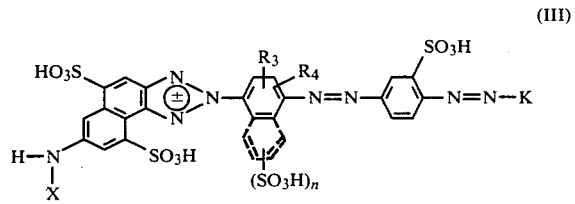

wherein
X, R$_3$, R$_4$, n and K have the abovementioned meaning.

Further preferred dyestuffs have the general formula (IV)

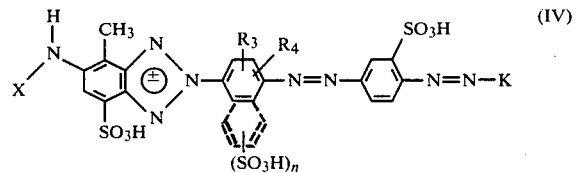

wherein
X, R$_3$, R$_4$, n and K have the abovementioned meaning.

Particularly preferred dyestuffs are those of the formula (V)

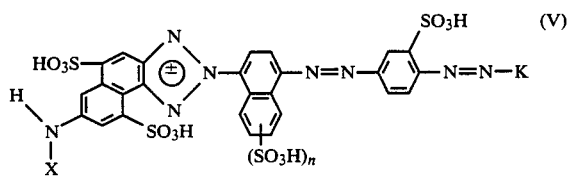

and those of the formula (VI)

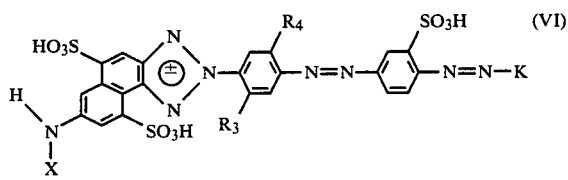

wherein

X, n, $R_3$, $R_4$ and K have the abovementioned meaning.

Further particularly preferred dyestuffs have the formula (VII)

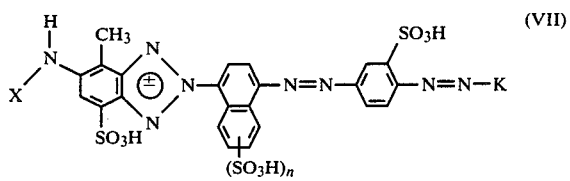

and the formula (VIII)

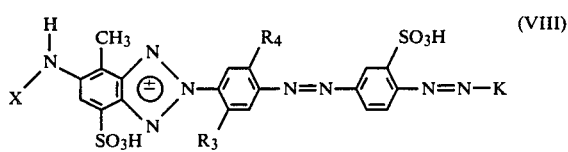

wherein

X, n, $R_3$, $R_4$ and K have the abovementioned meaning.

The following may be mentioned as examples of K-H coupling components: 3-methylpyrazol-5-one, 1-phenyl-3-methylpyrazol-5-one, 1-(2-chlorophenyl)-3-methylpyrazol-5-one, 1-(2,5-dichlorophenyl)-3-methylpyrazol-5-one, 1-(3-methylphenyl)-pyrazol-5-one-3-carboxylate and -ethylester, 1-phenyl-3-methylpyrazol-5-one-imide, 1-(2-chlorophenyl)-3-methylpyrazol-5-one-imide, 1,o-tolyl-3-methylpyrazol-5-one-imide, 1-(2-,3-,4-sulphophenyl)-3-methylpyrazol-5-one, 1-(6-chloro-3-sulphophenyl)-3-methylpyrazol-5-one, 1-(2,5-dichloro-4-sulphophenyl)-3-methylpyrazol-5-one, 1-(4-sulpho-2-methylphenyl)-3-methylpyrazol-5-one, 1-(6-chloro-3-sulpho-2-methylphenyl)-3-methylpyrazol-5-one, 1-(4-sulphophenyl)-3-methylpyrazol-5-one-imide, 1-(8-sulphonaphth-2-yl)-3-methylpyrazol-5-one-imide, 1-[6-sulphonaphth-2-yl]-3-methylpyrazol-5-one, 1-(4-sulphophenyl)-pyrazol-5-one-3-carboxylic acid, ethyl 1-(6-chloro-4-sulpho-2-methylphenyl)-pyrazol-5-one-3-carboxylate, 1-(4-aminophenyl)-3-methylpyrazol-5-one, 1-(3-aminophenyl)-3-methylpyrazol-5-one, 1-(3-amino-5-sulpho-2-methylphenyl)-3-methylpyrazol-5-one, 1-(4-aminophenyl)-pyrazol-5-one-3-carboxylic acid, 1-(3-aminophenyl)-pyrazol-5-one-3-carboxylic acid, 1-[3-(3-nitrobenzoyl)-aminophenyl]-pyrazol-5-one-3-carboxylic acid, 1-carboxymethyl-3-methylpyrazol-5-one, 1-(2-cyanoethyl)-3-methylpyrazol-5-one, 1-(2-chloroethyl)-3-methylpyrazol-5-one, 1-methyl-, -ethyl-, -propyl-3-methylpyrazol-5-one, 1,4-dimethyl-2-hydroxypyrid-6-one, 1,4-dimethyl-2-hydroxypyrid-6-one-5-carboxamide, -5-sulphonic acid and -5-methanesulphonic acid; 2-hydroxypyrid-6-one; 2-hydroxypyrid-6-one-4-carboxylic acid; 1-methyl-2,4-dihydroxypyrid-6-one-5-methyl carboxamide; 4-methyl-2-phenyl-1H,7H-pyrazolo[3,4-b]pyridine-3,6-dione; 4-methyl-2-(4-sulphophenyl)-1H,7H-pyrazolo[3,4-b]pyridine-3,6-dione; 2,4-dihydroxyquinoline; 4,6-dihydroxy-2-mercaptopyridine; 4-amino-2,6-dihydroxypyrimidine; 2-cyanoamino-4,6-dihydroxypyrimidine; 2-amino-4,6-dihydroxypyrimidine; 4-amino-6-hydroxy-2-mercaptopyridine; 1-methyl-2-hydroxy-4-methyl-5-cyanopyrid-6-one; 1-phenyl-2-hydroxy-4-methyl-5-cyanopyrid-6-one; 2,4,6-trihydroxypyrimidine; 2-methyl-4,6-dihydroxypyrimidine; 2-phenyl-4-amino-6-hydroxypyrimidine; 2-phenyl-4,6-dihydroxypyrimidine, 1-methyl-2,4-dihydroxyquinoline, 1-n-butyl-2,4-dihydroxyquinoline, indole, 2-methylindole, acetoacetanilide; -o-, -m- or -p-anisidide; -o-, -m- or -p-toluidide; p-chloroanilide of acetoacetic acid; 4-chloro-2-methylanilide of acetoacetic acid; 2,4- or 2,5- or 2,6-dimethylanilide of acetoacetic acid; 4-sulphoanilide of acetoacetic acid, 2-methoxy-4-sulpho-5-methylanilide of acetoacetic acid, 2,4-, 2,5- or 3,5-disulphoanilide of acetoacetic acid, 2,5-disulpho-4-acetaminoanilide of acetoacetic acid, 2- or 3-sulpho-4-ethoxyanilide of acetoacetic acid; 3-sulpho-4-methylanilide of acetoacetic acid, the compounds

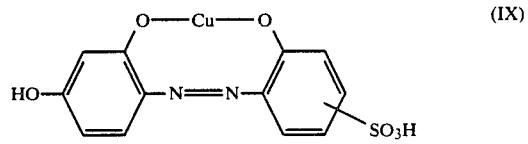

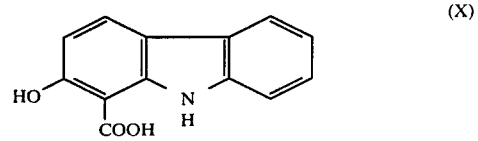

naphth-1-ol-3-, -4- or -5-sulphonic acid, naphth-2-ol-4-, -5-, -6- or -7-sulphonic acid, 6-aminonaphth-1-ol-3-sulphonic acid, 6-acetylaminonaphth-1-ol-3-sulphonic acid, 6-benzoylaminonaphth-1-ol-3-sulphonic acid, 7-aminonaphth-1-ol-3-sulphonic acid, 7-dimethylaminonaphth-1-ol-3-sulphonic acid, 7-anilinonaphth-1-ol-3-sulphonic acid, 7-acetylaminonaphth-1-ol-3-sulphonic acid, 7-benzoylaminonaphth-1-ol-3-sulphonic acid, 8-acetylaminonaphth-1-ol-5-sulphonic acid, 8-acetylaminonaphth-2-ol-5- or -6-sulphonic acid, 6-(4-aminobenzoylamino)-naphth-1-ol-3-sulphonic acid, 7-(2-aminoethyl-amino)-naphth-1-ol-3-sulphonic acid, 8-acetylamino- and benzoylamino-naphth-1-ol-3,5-disulphonic acid, 7-acetylaminonaphth-1-ol-3,6-disulphonic acid, 8-amino-, -acetylamino-, -benzoylamino-, benzenesulphonylaminonaphth-1-ol-3,6-disulphonic acid, naphth-1-ol-3,6-, -3,7-, -3,8-, -4,8- or 5,7-disulphonic acid, naphth-2-ol-3,6-, -3,7-, -4,8-, -5,7- or -6,8-disulphonic acid, naphthyl-1-amine-2- to -8-sulphonic acid, naphthyl-2-amine-1-, -5- to -8-sulphonic acid, naphthyl-1-amine-5,7-, -4,8-, -3,8-, -4,6-, -3,7- or -4,6-disulphonic acid, naphthyl-2-amine-5,7-, -4,7-, -3,7- or -3,6-disulphonic acid, 1-aminonaphthalene, 1- and 2-hydroxynaphthalene, 8-acetamino-2-hydroxynaphthalene, 8-methanesulphonylamino-2-hydroxynaphthalene, 1-hydroxynaphthalene-4-sulphonamide, 2-hydroxy-3-naphthoic acid, -naphthamide, -naphthanilide, -naphthchloroanilide and naphthtoluidide.

Phenol, 2-, 3- or 4-methylphenol, ethyl 1-hydroxybenzene-2-carboxylate, 2-, 3- or 4-chlorobenzene, 2-methyl-3-, -5- or -6-chlorophenol, 3-methyl-6-chlorophenol, 2-ethylphenol, 2,3- or 2,5- or 2,6- or 3,5-dichlorophenol, 2,6-diethylphenol, 2-cyclohexylphenol, 2-methoxyphenol or ethoxyphenol, 3-methoxyphenol, 3-acetylaminophenol, 4-hydroxydiphenyl, 4-cyclohexylphenol, 4-t-butylphenol, aniline, 2- or 3-methylaniline, 2,3-, 2,5- or 2,6-dimethylaniline, N-methyl- or N,N-dimethylaniline, N-ethylaniline, N,N-diethylaniline, N,N-dipropylaniline, N-(2-chloroethyl)-N-butylaniline, N-methyl-N-(2-hydroxyethyl)-aniline, N,N-bis-(2-hydroxyethyl)-aniline, N-methyl-N-(2-cyanoethyl)-aniline, N,N-diethyl-2- or -3-methylaniline, N,N-(bis-2-hydroxyethyl)-3-methylaniline, N,N-diethyl-3-acetaminoaniline, N,N-(bis-2-hydroxyethyl)-3-acetaminoaniline, N,N-diethyl-3-ethoxyaniline, N,N-(bis-2-hydroxyethyl)-2-methoxy-5-methylaniline, N,N-(bis-2-acetoxyethyl)-3-acetaminoaniline, phenol-2- or -3-sulphonic acid.

The dyestuffs of the general formula (I) can be prepared in different ways. The synthesis requires three diazotisations and couplings, a triazolation, if appropriate hydrolysis of acylamino groups or reduction of nitro groups, and a reaction with a fibre-reactive X-halogen radical. In the synthesis, the triazole grouping and the two azo bridges can be prepared in any order. The reaction with a fibre-reactive X-halogen radical advantageously takes place before or after a coupling, but in any case after the triazolation.

The preferred dyestuffs of the formula (II) are preferably obtained by diazotising compounds of the formula

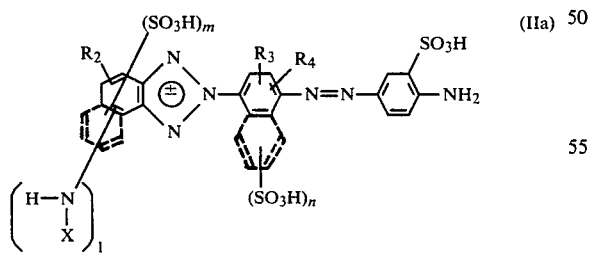

(IIa)

in a manner known per se and then reacting with a K-H coupling component where

X, 1, m, n, R₂, R₃, R₄ and K have the abovementioned meaning.

Furthermore, dyestuffs of the formula (V) to (VIII), for example, are advantageously prepared by diazotising a compound of the formula

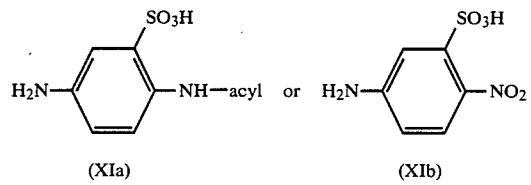

(XIa) (XIb)

where
acyl=an acyl radical having 1 to 10 C atoms, in particular formyl, acetyl, or benzoyl, and coupling onto compounds of the formulae

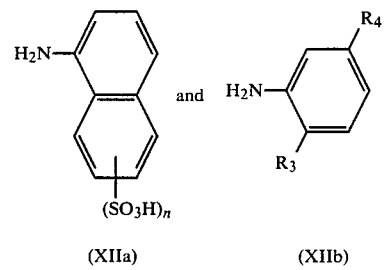

(XIIa) (XIIb)

further diazotising the monoazo dyestuff thus obtained and coupling onto compounds of the formulae

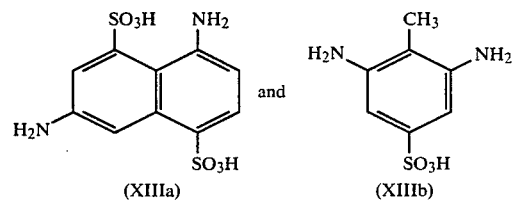

(XIIIa) (XIIIb)

and triazolating. After hydrolysis of the acylamino group of (XIa) or reduction of the nitro group of (XIb), diaminomonoazotriazoles of the formulae

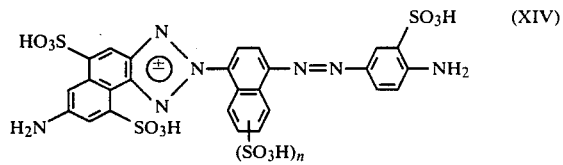

(XIV)

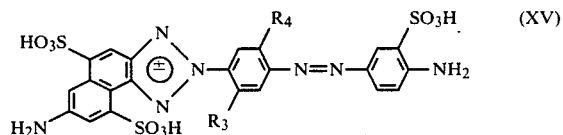

(XV)

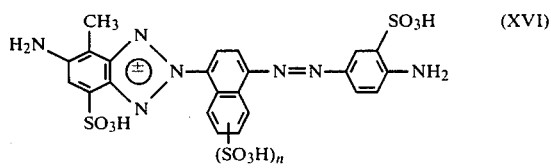

(XVI)

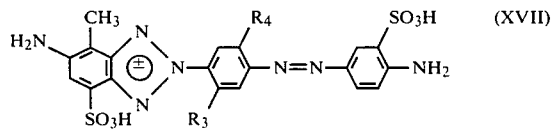

(XVII)

are obtained.

The reaction with a fibre-reactive X-halogen radical and subsequent diazotisation and coupling onto a K-H component then leads to dyestuffs of the formulae (V) to (VIII).

Dyestuffs of the formulae (III and IV) can be prepared in similar fashion by diazotising a disazo dyestuff of the formula (XVIII)

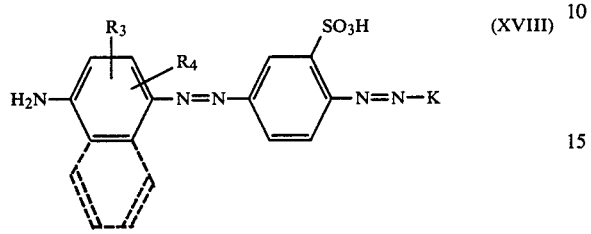

which is readily accessible via corresponding acylamino or nitro precursors, coupling onto compounds of the formula (XIIIa) or (XIIIb), and triazolating. The reaction with a fibre-reactive radical leads to dyestuffs of the formula (III+IV).

The new dyestuffs are particularly suitable for dyeing and printing natural and regenerated cellulose fibre materials, such as cotton and viscose staple, and natural and synthetic polyamide fibre materials, for example those made of wool, silk, poly-ε-caprolactam or the polycondensate of hexamethylenediamine and adipic acid. The dyeings which are obtained, in particular those on cotton and viscose staple, are distinguished by good fastness properties, in particular wet and light fastness properties.

The percentages given below are by weight, unless otherwise stated.

EXAMPLE 1

26 g of 4-oxalylamino-3-sulphoaniline are dissolved in 400 ml of water under neutral conditions, and 70 ml of a 10% strength nitrite solution are added, followed at 0°-5° C. by 30 ml of 30% strength hydrochloric acid to initiate the diazotisation. Excess nitrite is destroyed after 30 minutes using a small amount of sulphamic acid. This diazotisation suspension is allowed to flow into a neutral solution of 22.5 g of 1-naphthylamine-6-sulphonic acid in 110 ml of water while, at the same time, a pH ≦7 is maintained using sodium carbonate solution. The coupling is complete within a short time. A further 70 ml of a 10% strength nitrite solution are added. This solution is allowed to flow into a mixture of 30 ml of 30% strength hydrochloric acid and 200 g of ice. The mixture is stirred for 1 hour, and excess nitrite is destroyed using sulphamic acid. This diazo suspension is allowed to flow into a neutral solution of 33 g of 1,6-diaminonaphthalene-4,8-disulphonic acid in 120 ml of water while, at the same time, a pH ≦7 is again maintained using sodium carbonate solution. When the coupling is complete the mixture is raised to 80° to 90° C. and is triazolated by adding 56 g of copper sulphate and 90 ml of ammonia (25% strength). When the triazolation is complete, 10% by volume of sodium hydroxide solution is added to 40%, and the oxalyl group is completely hydrolysed at 80° to 90° C. in the course of 1 hour. The mixture is filtered hot, and the triazole is precipitated with salt and filtered off with suction at room temperature, affording about 150 g of a paste of a diaminomonoazotriazole which, in the form of the free acid, has the following formula:

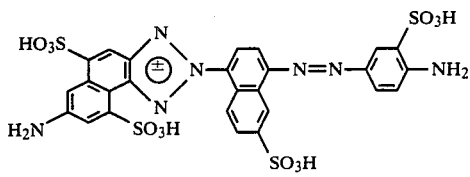

EXAMPLE 2

26 g of 4-oxalylamino-3-sulphoaniline are diazotised as in Example 1. 10.7 g of 3-methylaniline are added dropwise in the cold in the absence of a solvent to the diazotisation suspension. The pH is raised to 7 in the course of several hours using sodium carbonate solution. The further diazotisation of this aminomonoazo dyestuff, the coupling onto 1,6-diaminonaphthalene-4,8-disulphonic acid, the triazolation, the hydrolysis and the isolation are effected analogously to Example 1, affording about 140 g of a paste of a diaminomonoazotriazole which, in the form of the free acid, has the following formula:

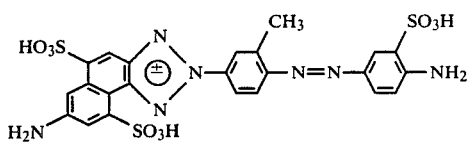

EXAMPLE 3

Example 1 is repeated, except that 2,6-diaminotoluene-4-sulphonic acid is used in place of 1,6-diaminonaphthalene-4,8-disulphonic acid, affording a triazole which, in the form of the free acid, has the following formula:

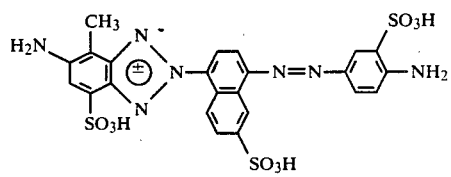

EXAMPLE 4

Example 2 is repeated, except that 1,6-diaminonaphthalene-4,8-disulphonic acid is replaced by 2,6-diaminotoluene-4-sulphonic acid, affording a triazole which, in the form of the free acid, has the following formula:

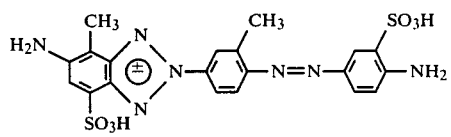

EXAMPLE 5

The entire paste of Example 1 is dissolved in 1,000 ml of hot water, and the solution is cooled down to room temperature by means of ice. 9 ml of 2,4,6-trifluoro-5- chloropyrimidine are added dropwise at room temperature. The pH is kept at a constant value by adding sodium carbonate. When the reaction is complete, 18 ml of a 30% strength nitrite solution are added, and the mixture is cooled down to 10° C. by means of ice and is made acid to Congo red by means of hydrochloric acid.

Following stirring for 30 minutes, excess nitrite is destroyed with sulphamic acid. 13 g of 2-hydroxypyrid-6-one-4-carboxylic acid are sprinkled in. The pH is then slowly adjusted to 7 by means of sodium carbonate solution. The coupling is complete in a short time, and the product is filtered off with suction and dried in vacuo. The dyestuff, in the form of the free acid, has the formula

EXAMPLE 6

Example 5 is repeated, except that the triazole of Example 2 is used in place of the triazole of Example 1, affording a dyestuff which, in the form of the free acid, has the following formula:

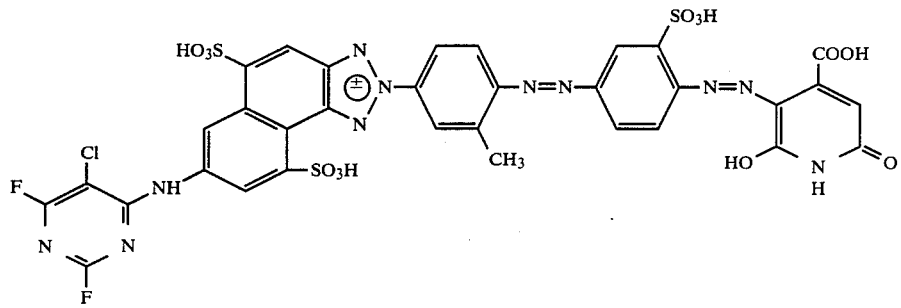

($\lambda_{max}$ = 460 nm)

It produces, on cotton and viscose staple, orange dyeings and prints having very good wet and light fastness properties.

EXAMPLE 7

If the triazole of Example 5 is replaced by the triazoles mentioned in column 1 of Table 1, the 2,4,6-trifluoro-5-chloropyrimidine of Example 5 is replaced by

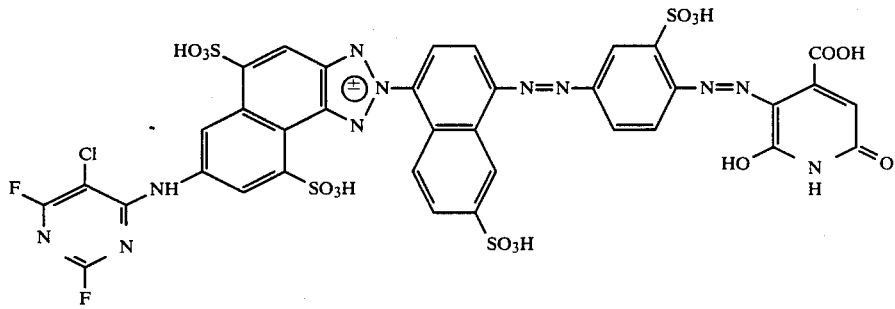

($\lambda_{max}$ = 470 nm)

It produces, on cotton and viscose staple, scarlet prints and dyeings having very good wet and light fastness properties.

the reactive groups mentioned in column 2 of Table 1 and if the 2-hydroxypyrid-6-one-4-carboxylic acid of Example 5 is replaced by the coupling components mentioned in column 3 of Table 1, this gives likewise new, very useful reactive dyestuffs whose shade is given in column 4.

TABLE 1

| Column 1 Diamino-triazole of Example No. | Column 2 Reactive group | Column 3 Coupling component | Column 4 Shade on cotton | $\lambda_{max}$ [nm] |
| --- | --- | --- | --- | --- |
| 1 | | | yellow | 440 |

TABLE 1-continued
| Column 1 Diaminotriazole of Example No. | Column 2 Reactive group | Column 3 Coupling component | Column 4 Shade on cotton | $\lambda_{max}$ [nm] |
|---|---|---|---|---|
| 2 | 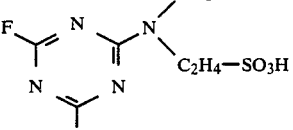 | 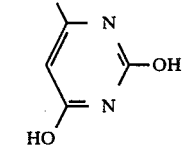 | yellow | 430 |
| 3 | 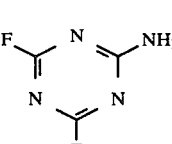 | 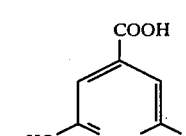 | orange | 460 |
| 2 | 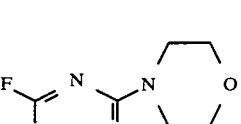 | 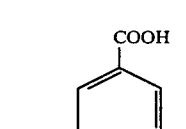 | orange | 460 |
| 1 | 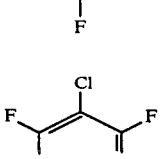 | 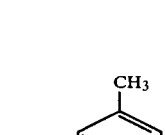 | scarlet | 470 |
| 1 | 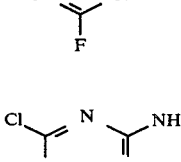 | 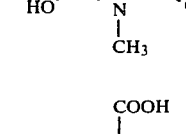 | scarlet | 470 |
| 1 | 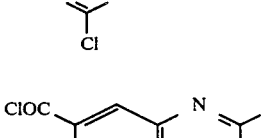 | 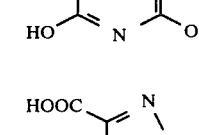 | reddish-tinged red | 450 |
| 1 | 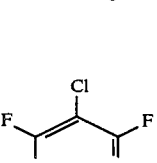 | 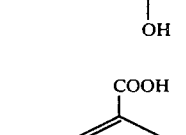 | red | 500 |
| 1 | 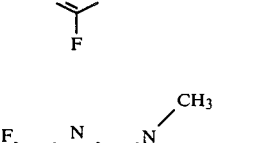 | 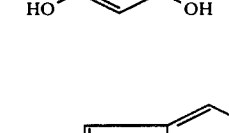 | reddish brown | 470 (broad) |

TABLE 1-continued

| Column 1 Diaminotriazole of Example No. | Column 2 Reactive group | Column 3 Coupling component | Column 4 Shade on cotton | $\lambda_{max}$ [nm] |
|---|---|---|---|---|
| 1 | F–C(=N)–N(CH₃)–CH₂–SO₃H triazinyl with two F | 1-butyl-2-hydroxy-4-oxo-quinoline | scarlet (dull) | 470 |
| 1 | 5-chloro-2,4,6-trifluoropyrimidine | 4-hydroxy-naphthalene-2,7-disulfonic acid (HO₃S, SO₃H) | bluish-tinged red | 530 |
| 1 | dichlorotriazinyl-guanidine (Cl, NH₂) | Cu-complex of o,o'-dihydroxyazo with OH and SO₃H | dark brown | 490 (broad) |
| 1 | F–triazinyl–NH–C₂H₄–O–SO₃H | 3-hydroxy-carbazole-2-carboxylic acid | yellowish brown | 400 (very broad) |
| 1 | 5-chloro-2,4,6-trifluoropyrimidine | 2,4,6-triamino-pyrimidine | reddish brown | 470 |
| 1 | 5-chloro-2,4,6-trifluoropyrimidine | 1,4-dimethyl-3-sulfomethyl-6-hydroxy-2-pyridone | scarlet | 470 |
| 2 | 2,3-dichloroquinoxaline-6-carbonyl chloride | 1-(2-methyl-4-sulfophenyl)-3-methyl-5-hydroxy-pyrazole | yellow | 440 |
| 2 | 5-chloro-2,4,6-trifluoropyrimidine | 3,5-dihydroxybenzoic acid | red | 490 |

TABLE 1-continued

| Column 1 Diaminotriazole of Example No. | Column 2 Reactive group | Column 3 Coupling component | Column 4 Shade on cotton | $\lambda_{max}$ [nm] |
|---|---|---|---|---|
| 2 | difluorotriazinyl with N(CH$_3$)–N(CH$_2$SO$_3$H)CH$_3$ substituent | 4-hydroxy-1-methyl-2-quinolone | orange brown | 460 |
| 2 | 2,4,5-trifluoro-6-chloropyrimidine | 1-hydroxy-naphthalene-3,6-disulfonic acid (H$_3$OS–naphthalene–OH, SO$_3$H) | bluish-tinged red | 520 |
| 2 | " | Cu-complex of bis-azo compound with HO, N=N, SO$_3$H | dark brown | 480 (broad) |
| 3 | " | 4,6-dihydroxy-2-hydroxypyrimidine | yellow | 430 |
| 3 | " | 2,6-dihydroxyisonicotinic acid (COOH, HO–N–OH) | scarlet | 460 |
| 3 | " | 3,5-dihydroxybenzoic acid | red | 490 |
| 3 | " | 1-hydroxy-naphthalene-3,6-disulfonic acid | bluish-tinged red | 520 |
| 3 | " | 4-methyl-3-sulfo-6-hydroxy-1-methyl-2-pyridone | scarlet | 460 |
| 4 | " | 4,6-dihydroxy-2-hydroxypyrimidine | yellow | 420 |

TABLE 1-continued

| Column 1 Diaminotriazole of Example No. | Column 2 Reactive group | Column 3 Coupling component | Column 4 Shade on cotton | $\lambda_{max}$ [nm] |
|---|---|---|---|---|
| 4 | " | (structure: pyridone with COOH, HO, OH, N) | orange | 450 |
| 4 | " | (structure: benzoic acid 3,5-dihydroxy) | scarlet | 480 |
| 4 | " | (structure: naphthol with OH, HO₃S, SO₃H) | red | 510 |
| 1 | 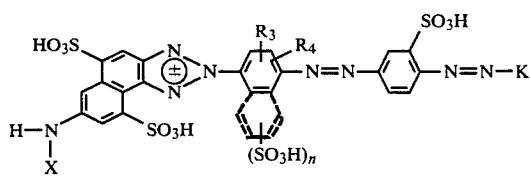 | 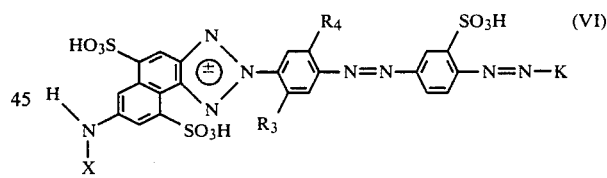 | reddish-tinged yellow | 440 (broad) |
| 2 | " | " | yellow | 430 (broad) |
| 3 | " | " | " | 430 (broad) |
| 4 | " | " | " | 420 (broad) |

I claim:
1. A reactive dyestuff of the formula

(III)

wherein
X is a triazine or pyrimidine reactive group;
$R_3$ and $R_4$ are each hydrogen, $C_1$-$C_4$-alkyl or $C_1$-$C_4$-alkoxy n is 0 or 1; and
K is a pyridone or pyrimidone coupling component.

2. Reactive dyestuffs according to claim 1, of the formula (VI)

wherein
X, n, $R_3$, $R_4$ and K have the meaning given in claim 1.

* * * * *

UNITED STATES PATENT AND TRADEMARK OFFICE
CERTIFICATE OF CORRECTION

PATENT NO. : 4,556,707
DATED : December 3, 1985
INVENTOR(S) : Hermann Henk

It is certified that error appears in the above-identified patent and that said Letters Patent is hereby corrected as shown below:

Abstract, line 3     Beginning of formula delete " 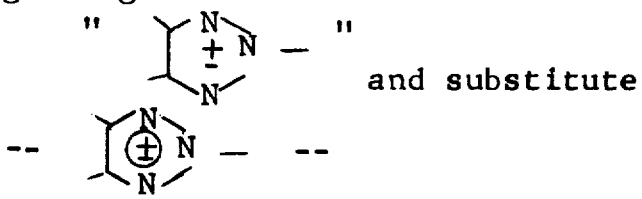 " and substitute

Abstract, line 3     Middle of formula delete dotted structure and substitute:

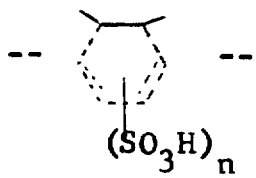

Col. 5, line 22     Delete "2-methylsulphonyl-" and substitute -- 2-ethylsulphonyl- --

Col. 11, line 48     Before "7" delete " $\leq$ " and substitute -- $\leq$ --

Col. 16, line 6 under "Column 4 Shade on red"     Delete "reddish-tinged red" and substitute --reddish-tinged orange--

Signed and Sealed this

Eighteenth Day of February 1986

[SEAL]

Attest:

DONALD J. QUIGG

Attesting Officer     Commissioner of Patents and Trademarks